(12) United States Patent
Farhadiroushan

(10) Patent No.: US 6,285,446 B1
(45) Date of Patent: Sep. 4, 2001

(54) DISTRIBUTED SENSING SYSTEM

(75) Inventor: Mahmoud Farhadiroushan, London (GB)

(73) Assignee: Sensornet Limited, Ely (GB)

( * ) Notice: Subject to any disclaimer, the term of this patent is extended or adjusted under 35 U.S.C. 154(b) by 0 days.

(21) Appl. No.: 09/441,015

(22) Filed: Nov. 16, 1999

Related U.S. Application Data

(63) Continuation of application No. PCT/GB98/01442, filed on May 19, 1998.

(30) Foreign Application Priority Data

May 19, 1997 (GB) .................................... 9710057

(51) Int. Cl.$^7$ ...................................................... G01B 9/02
(52) U.S. Cl. .......................................... 356/35.5; 356/450
(58) Field of Search .......................... 374/161; 356/35.5, 356/450

(56) References Cited

U.S. PATENT DOCUMENTS 4,360,272 * 11/1982 Schmadel et al. .................... 356/352
4,859,017 * 8/1989 Brierley et al. ...................... 356/345

FOREIGN PATENT DOCUMENTS 8707014   11/1987   (WO) .
9206358    4/1992   (WO) .

OTHER PUBLICATIONS

Dakin et al., "Distributed Optical Fibre Raman Temperature Sensor Using a Semiconductor Light Source and Detector", Electronics Letters, vol. 21, No. 13, Jun. 20, 1985, pp. 569–570.

Hartog, et al., "Distributed Temperature Sensing in Solid Core Fibres", Electronics Letters, vol. 21, No. 23, Nov. 7, 1985, pp. 1061–1062.

Zimmerman et al., "Fiber–Optic Sensors Using High–Resolution Optical Time Domain Instrumentation Systems", J. of Lightwave Technology, vol. 8, No. 9, Sep. 1990, pp. 1273–1277.

Ripamonti et al., "No Dead–Space Optical Time–Domain Reflectometer", J. of Lightwave Technology, vol. 8, No. 9, Sep. 1990, pp. 1278–1283.

Feced et al., "Zero Dead–Zone OTDR with High–Spatial Resolution for Short Haul Applications, " IEEE Photonics Technology Letters, vol. 9, No. 8, Aug. 1997, pp. 1140–1142.

Patent Abstracts of Japan, EPO Pub. No. 04204114, Jul. 24, 1992, 1 page.

* cited by examiner

Primary Examiner—Frank G. Font
Assistant Examiner—Andrew H. Lee
(74) Attorney, Agent, or Firm—Baker Botts L.L.P.

(57) ABSTRACT

A system for measuring the strain in a structure in which the temperature at the location the strain is measured is also measured in which an optic fiber is incorporated in the structure which has an interferometer positioned at the point or points where the strain is to be measured. A pulse of light is sent down the fiber and the backscattered light is split to separate the Raman Scattered Spectrum light. The interferometer is used to measure the strain and the Raman Scattered Spectrum light is used to measure temperature and loss.

21 Claims, 2 Drawing Sheets

DISTRIBUTED SENSING SYSTEM

This application is a continuation of PCT/GB98/01442 filed May 19, 1998.

The present invention relates to an improved apparatus and method for measuring strain in materials and relates particularly to distributed sensor systems using optical fibres.

BACKGROUND OF THE INVENTION

There has been considerable interest in using optical fibres for the measurement of a wide range of physical and environmental parameters, in particular where the inherent properites of optical fibres offer significant advantages. In applications such as structural monitoring, there is a need for distributed sensor systems for the measurement of strain and temperature, particularly at serial locations. Distributed and multiplexed systems are particularly attractive as they offer monitoring of physical parameters along a length of an optical fibre with benefits of high selectivity and small dimensions enabling them to be readily deployed or embodied within the structure.

It is well known to measure or detect the strain in a structure using interferometer techniques to measure the optical path length changes along a length of optical fibre. For example, when a length of optical fibre is subjected to a strain its length increases and thus the optical path for light passing down the fibre is likewise increased.

However, the temperature variation along a length of sensing fibre can also result in changes of the optical path length of the sensing fibre and make it difficult to distinguish the temperature effects from the strain effects. To try to compensate for this temperature effect the temperature can be measured using, for example, a separate fibre or segment of fibre not subjected to the strain field. However this requires the use of extra fibres and, due to the necessary displacement of this fibre or segment of fibre from the fibre used to measure the strain, accuracy cannot be assured.

SUMMARY OF THE INVENTION

We have now devised an apparatus and a method for the simultaneous measurement of temperature and strain along an optic fibre.

The method of the invention can be used in connection with the measurement of strain in which an interferometer is used to measure the variation in length along a section of a fibre, excited by a pulse of light, so as to generate interference signals which vary with change in length of the fibre. In this technique it is important to know the temperature at the location at which the strain is measured so that suitable correction can be made.

According to the invention there is provided a method for measuring the strain in a structure which method comprises using an optical interferometer means for measuring the strain at at least one location in the structure and substantially simultaneously measuring the loss and the temperature distributions by detecting and measuring the Raman Scatter Spectrum (RSS).

The strain can be measured along a length or segment of optical fibre by use of sensing interferometer means by sending a pulse of light down the optical fibre and detecting and measuring the signal reflected back from the interferometer means.

The strain can be measured using a sensing interferometer or a plurality of sensing interferometers positioned along a length of optical fibre so as to form a sensing network. The sensing interferometer can comprise a pair of reflective means, with the path length between the reflective means varying with changes in physical parameters such as the strain in the fibre and the temperature.

The interferometer means can be formed from two reflective surfaces positioned a suitable distance apart, which reflect only a small percentage of the incident light, e.g. less than 1% so that a plurality of interferometers can be positioned along a fibre without any substantial attenuation of the light. Preferably the optical path length delay of the interferometer is greater than the coherence length of the light transmitted down the optical fibre. In one embodiment the reflective surfaces can be formed by reflective splices in the optic fibre.

The path length variations in the interferometer means can be converted to an intensity modulation, e.g. by using the reference interferometer means and so as to provide a sensitive means of measuring the temperature and strain. The amplitude of the backscattered light and the reflected radiation from the interferometer means is directly detected to provide compensation and correction for fibre attenuation effects and variations in the reflectivities of the interferometer means.

By use of a wavelength selection means the light originating from the interferometer means and the scattered RSS light can be passed down different channels.

The temperature can be measured by RSS by detecting and measuring the RSS from a point or series of points along the fibre to give a temperature profile along the fibre.

If there is a discontinuity in the optical fibre due, e.g. to an irregularity in the fibre or due to coupling device through which the light passes this will affect the amplitude of the RSS in a discontinuous manner and so can be used to monitor such discontinuities. In one embodiment this can be used to measure both the loss and reflection of the light when it passes through a coupling or splicing junction in the optical fibre. Since the Raman backscatter light is generated due to in-elastic scattering in the optical fibre and its frequence is shifted relative to the input optical source frequency, it can be optically filtered from Fresnel reflections at a junction. In this case the RSS measured at various points along the fibre will show a discontinuity in the profile and this discontinuity will be a measure of the loss experienced by light passing through the junction. The reflection at the junction can be measured by detecting the light reflected at the input optical source frequency which undergoes elastic scattering.

The means for detecting and measuring the RSS preferably is able to detect the amplitude of the RSS and to measure the amplitude of the anti-Stokes and Stokes components. The anti-Stokes component provides the temperature information and the Stokes component provides information derived from losses from the fibre. This enables a temperature profile along the length of the fibre to be computed and thus the temperature at the interferometer or interferometers to be computed. The RSS signal can be acquired by means of a data acquisition means such as a router/multiplexer.

Preferably the light transmitted back down the optical fiber is fed to a detection processing means which comprises a wavelength selection means, a reference interferometer means, detection means and processing means. The wavelength selection means can select and separate the Stokes and anti-Stokes components of RSS. The amplitudes of Stokes and anti-Stokes can be measured and then processed to evaluate predominately the loss and the temperature along the optical fibre independent of the strain. The optical delay of the sensing interferometers, which varies with strain and temperature, can be monitored by passing a portion of light though a reference interferometer and detecting the output interference pattern. A portion of light can also be selected to measure the Rayleigh backscatter power, the interferometer reflectivities and the distance between the interferometers which can provide a coarse measure of the strain and temperature along the fibre.

The output of all the detection means can be passed to a computation means to compute the strain and temperature of the sensing interoferometer as well as overall temperature of the sensing fibre.

A sensing network formed using the present invention can be a single mode or polarisation maintaining or multimode optical fibre comprising a plurality of sensing interferometers and means of converting the magnitude of physical parameters to a change of optical path-length of the sensing interferometers.

The sensing interferometer means may be comprised of reflective means to form in-line interferometers.

A reflective means may be formed by a reflective splice or by exposing the fibre to ultra-violet light to modify the refractive index of the fibre in a single or multiple sections.

The sensing interferometer means may be polarimetric sensors formed along a high birefringence optical fibre by introducing pairs of polarisation cross-coupling pairs such as by splicing two sections of the fibre with their polarisation axes rotated with respect to each other or by exposing the fibre to an ultra-violet light at an angle to the two polarisation axes.

The source means may be a gain-switched laser or a Q-switched laser or a mode-locked laser and its emission wavelength may be tuneable and its pulse repetition rate may be adjustable.

The source means may be constructed using semiconductor devices and optical fibre components.

The wavelength selection means can comprise directional couplers, optical gratings, optical filters, a monochromator or integrated optical filters.

The reference interferometer means may be a Mach-Zehnder interferometer or a Michelson interferometer or a Fabry-Perot interferometer and it may be constructed using fibre optical components.

The detection processing means can comprise of high senstivity detectors such as such as photomultipliers, avalanche photodiodes and detector arrays, amplifiers, multiplexer or router, optical switches and can utilise digital electronic timing devices such as fast sampling digitizers or time-to-amplitude converters such as one utilising time-resolved photon counting.

BRIEF DESCRIPTION OF THE DRAWINGS

Embodiments of the invention will now be described solely by way of example and with reference to the accompanying drawings in which.

DETAILED DESCRIPTION OF THE PREFERRED EMBODIMENTS

Figure 1:
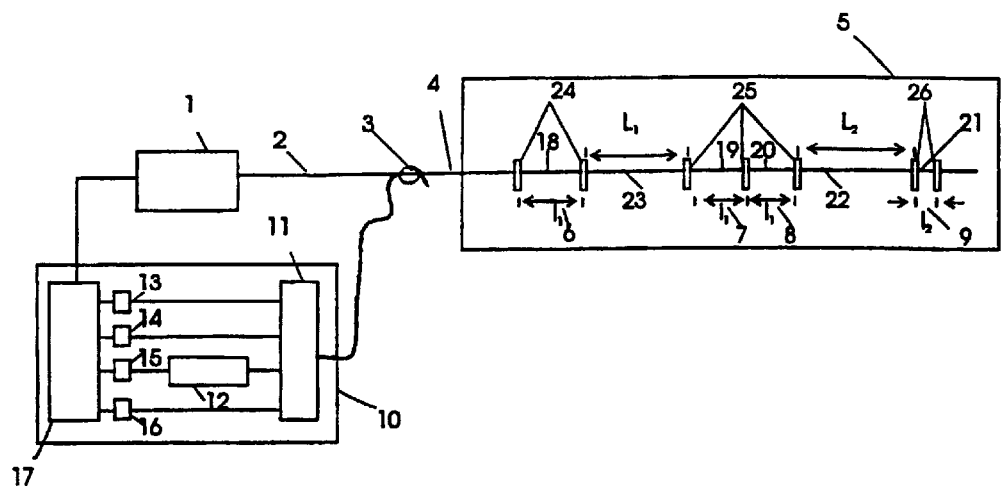
FIG. 1 is a diagram of an embodiment of the present invention in which in-line optical fibre interferometer means formed along a length of optical fibre are interrogated to simultaneously measure temperature and strain.
Figure 2:
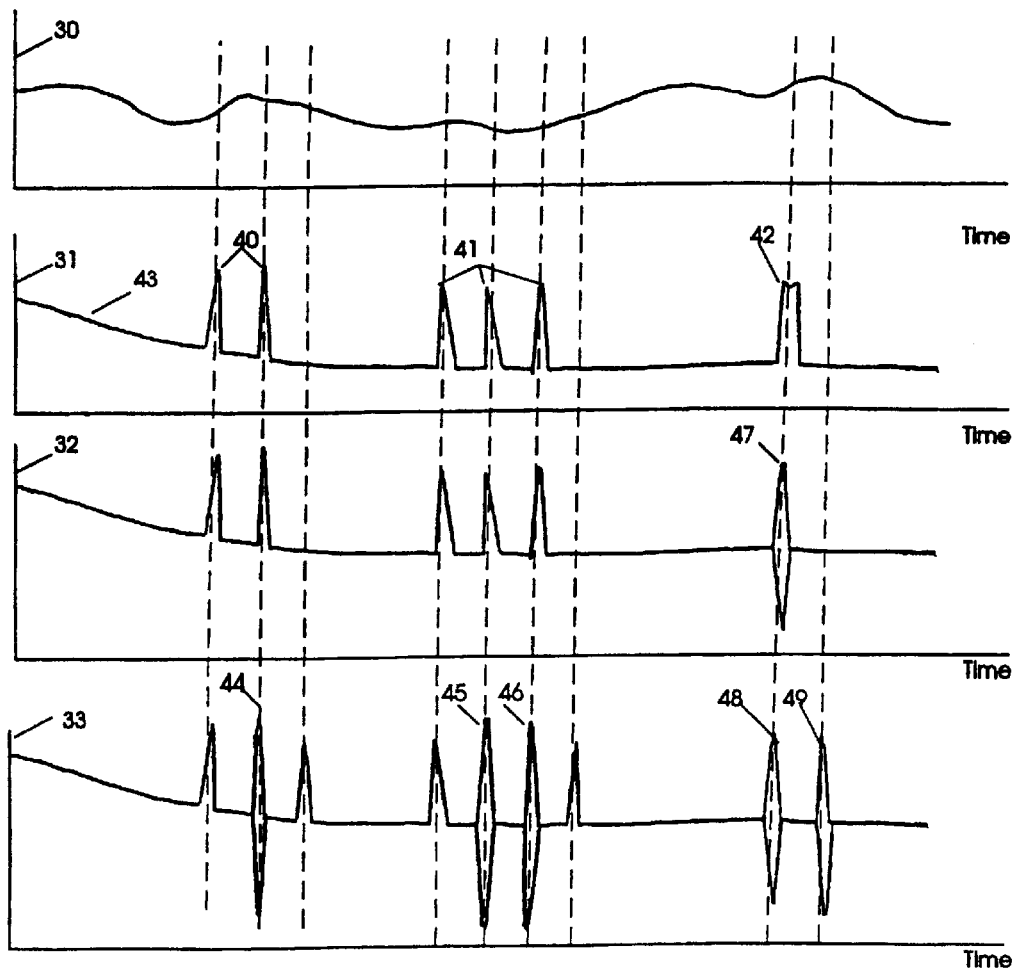
FIG. 2 is a diagram illustrated schematically the amplitude response of the detection means to evaluate temperature and strain.
Figure 3:
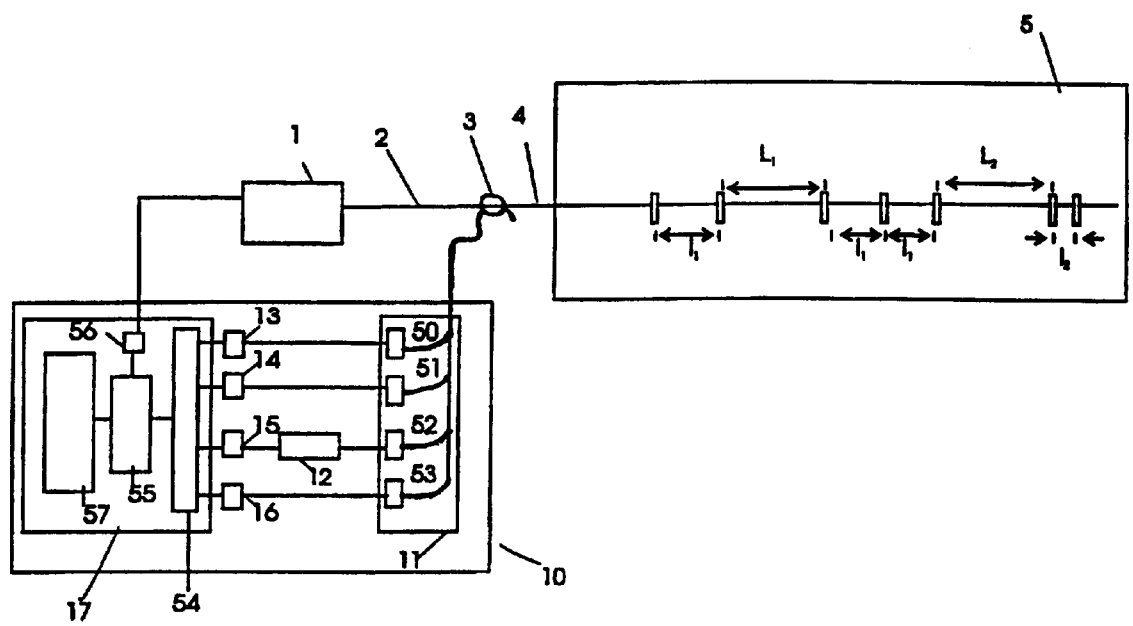
FIG. 3 is a diagram of an embodiment of the present invention in which a time-resolved photon counting technique is used to measure the amplitude of the scattered photons.

An embodiment of the present invention, in which in-line optical fibre sensing interferometer means are used is shown in FIG. 1. A light source means (1) which radiates pulses of light is conveyed by optical fibre (2) to optical fibre coupler (3) into optical fibre lead (4) and then into the sensing network means (5). The sensing network means contains a plurality of sensing interferometer means (6, 7, 8, 9). The optical path length of the sensing interferometer means varies with the magnitude of physical parameters such as strain and temperature. A portion of the light is reflected back by the sensing network means (5) into optical fibre coupler (3) and a portion enters detection system means (10). The detection system means (10) contains a wavelength selection means (11), a reference interferometer means (12), detector means (13, 14, 15, 16) and a computing means (17). FIG. 2 illustrates the output response of the detection system means (30, 31, 32, 33).

The wavelength selection means (11) separates the Raman backscatter light into a band of anti-Stokes and Stokes components which are converted to an electrical signal by detector means (13, 14). By measuring the time delay of the backscattered light from each pulse, the position along the fibre where the backscattered light originates can be computed. The computing means (17) can then determine the temperature along the fibre and map out a temperature profile of the fibre by taking the ratio of anti-Stokes to Stokes signals (30).

The sensing interferometer means (6, 7, 8, 9) may be constructed using pairs of in-line reflective elements (24, 25, 26). The optical path delays (18, 19, 20) between the reflective elements may be greater than the timing resolution of the source and detector response so that the reflections (40, 41) of reflective elements (24, 25) can be resolved. In this case, it is possible to concatenate the sensing interferometer means (7, 8). Alternatively, the optical path delay (21) of the sensing interferometer may be shorter than the timing resolution of the source and detector response so that the reflection pair overlap (42) but the path delay between the sensing interferometers (22, 23) are resolved.

A portion of returned light enters a detector means (16) to measure the reflectivity (40, 41, 42) of the reflective elements with reference to the Rayleigh backscatter light (43). For example, when the spatial resolution is in a range of 10 cm down to 1 cm, a reflectivity of 0.1% can result in an increase of returned light by a factor of 10 dB compared to the Rayleigh backscatter light. In addition, the computing means can determine the variations of the path delay between the sensing interferometer means (22, 23) as a coarse measure of strain and temperature along the fibre.

The path length variations of the sensing interferometer means are measured by detecting a portion of returned light (33) which passes through a reference interferometer means (12) where a reference path delay may be selected to match a sensor path delay and detecting coherent interference patterns (44, 45, 46) with the detector means (15).

When the reflections (42) of the reflective pair elements (25) of the sensing interferometer means (8) overlap, it is also possible to measure directly the coherent response of the sensing interferometer (32) by detecting a portion of light which has coherence greater than the optical path delay of the interferometer (47, 48, 49).

The fringe ambiguity resulting from cosinusoidal response of the interferometer may be resolved by measuring the interference amplitude at different operating wavelengths to extend the dynamic range of the interferometer.

The computing means (17) can determine the temperature, the reflectivity and optical path delay along the sensing fibre network means (5) and make the appropriate correction to enable the strain at these locations to be determined.

FIG. (3) shows an embodiment of the present invention where the detection system means comprises of a time-to-amplitude converter and a multi-channel analyser to measure the arrival time and the intensity distribution for the reflected light along the optical fibre. A portion of returned light is split in the wavelength selection means (11) and the Raman Stokes and the anti-Stokes components are separated using optical filters (50, 51). The arrival of Stokes and anti-Stokes photons are detected by detector means (13, 14) such as photomultipliers. A portion of light at the wavelength emitted by the source means (1) is selected by optical filter (52) and is then passed through a reference interferometer means (12).

The resultant interference pattern is measured by the detector means (15) to determine the optical path delay of sensing interferometers. The reflected and the backscatter signals are measured by selecting a portion of light within the wavelength band of the source means (1) using an optical filter (53) and detector means (16). The output of the detector means are fed to a time-to-amplitude converter (55) via a router (54). The time-to-amplitude converter (55) and the source means (1) are synchronously triggered by a pulse-delay generator (56) and the arrival time of photons are registered in a microprocessor controlled multi-channel analyser (57). The measurement is repeated over a large number of optical pulse excitations and histograms of arrival time of photons for the detector means are obtained. The amplitude of the returned light may be balanced in such a way as to minimise distortion in the number of photons counted in each detection means.

What is claimed is:

1. A method for measuring strain and temperature at a location in a structure comprising:
   providing a structure including optical fibre,
   providing interferometer means positioned at a location along a length of the optical fibre where strain is to be measured,
   transmitting a pulse of light along the optical fibre and reflecting the light with the interferometer means wherein the reflected light includes scattered Raman Scatter Spectrum light,
   measuring the scattered Raman Scatter Spectrum light, and determining temperature from the measured Raman Scatter Spectrum light.

2. A method according to claim 1 wherein the interferometer means comprises a pair of reflective means with a path length between reflective means wherein the path length varies with strain in the fibre and temperature.

3. A method according to claim 2 wherein the pair of reflective means includes two reflective surfaces positioned apart wherein each reflective surface reflects a portion of the transmitted light.

4. A method according to claim 3 wherein the path length is greater than a coherence length of the transmitted light.

5. A method according to claim 3 wherein the reflective surfaces are splices in the fibre.

6. A method according to claim 2 further comprising converting path length variations in the interferometer means to an intensity modulation by comparison with a reference interferometer means which is not subject to strain.

7. A method according to claim 2 comprising detecting the amplitude of the scattered Raman Scatter Spectrum light and the reflected light.

8. A method according to claim 1 comprising detecting and measuring scattered Raman Scatter Spectrum light from a plurality of locations along the length of the optical fibre.

9. A method according to claim 4 comprising detecting and measuring scattered Raman Scatter Spectrum light from a plurality of locations along the length of the optical fibre.

10. A method according to claim 1 comprising detecting the amplitude of the scattered Raman Scatter Spectrum light and measuring anti-stokes and stokes components of the scattered Raman Scatter Spectrum light.

11. A method according to claim 4 comprising detecting the amplitude of the scattered Raman Scatter Spectrum light and measuring anti-stokes and stokes components of the scattered Raman Scatter Spectrum light.

12. A method according to claim 11 comprising conveying the reflected light to detection processing means comprising wavelength selection means, a reference interferometer means, detection means and processing means wherein the wavelength selection means selects and separates the stokes and anti-stokes components of the scattered Raman Scatter Spectrum light.

13. A method according to claim 1 comprising passing a portion of the reflected light through a reference interferometer and detecting an interference pattern.

14. A sensing network comprising:
    a structure including at least one optical fibre,
    interferometer means positioned at a location along the optical fibre where strain is to be measured,
    means for transmitting a pulse of light along the optical fibre,
    means for detecting and measuring light reflected back from the interferometer means wherein the reflected light includes scattered Raman Scatter Spectrum light wherein the means for detecting and measuring light includes different channels for receiving the reflected light and scattered Raman Scatter Spectrum light and means for determining temperature from scattered Raman Scatter Spectrum light.

15. A sensing network according to claim 14 wherein the optical fibers are selected from the group consisting of a single mode optical fibre, polarization maintaining optical fibre and multimode optical fibre and wherein the optical fibre comprises a plurality of sensing interferometers and further comprising means for converting magnitude of physical parameters to a change of optical path length of the sensing interferometers.

16. A sensing network according to claim 15 wherien the sensing interferometers are in-line interferometers and comprise reflective means.

17. A sensing network according to claim 14 wherein the wavelength selection means comprises directional couplers, optical gratings, optical filters and a monochromator.

18. A sensing means according to claim 14 wherein the optical fibre is high birefringence optical fibre and the sensing interferometer means includes pairs of polarization cross-coupling points along the length of high birefringence optical fibre and wherein an optical path length difference between polarization modes generated from said pairs of polarization cross-coupling points is greater than coherence of backscattered light and further comprising means for coupling a portion of light substantially in a first light polarization mode to light in another polarization mode orthogonal to the first polarization mode.

19. A sensing network according to claim 18 wherein the means for detecting includes a detector selected from the group consisting of photomultipliers, avalanche photodiodes, detector array amplifiers, multiplexers, routers and optical switches and wherein the means for detecting includes a digital electronic timing device.

20. A method for measuring strain and temperature at a location in a structure comprising:

providing an optical fibre, providing an interferometer positioned at a location along a length of the optical fibre where strain is to be measured, transmitting a pulse of light along the optical fibre and reflecting the light with the interferometer wherein the reflected light includes scattered Raman Scatter Secptrum light, and measuring the scattered Raman Scatter Spectrum light and determining temperature from the measured Raman Scatter Spectrum light.

21. A sensing network comprising:

a structure including at least one optical fibre, an interferometer positioned at a location along the optical fibre where strain is to be measured, a light source which generates a pulse of light, a detecting and measuring assembly which receives light reflected back from the interferometer wherein the reflected light includes scattered Raman Scatter Spectrum light and wherein the detecting and measuring assembly includes different channels for receiving the reflected light and scattered Raman Scatter Spectrum light and a processor for determining temperature from the scattered Raman Scatter Spectrum light.

* * * * *

UNITED STATES PATENT AND TRADEMARK OFFICE
CERTIFICATE OF CORRECTION

PATENT NO.   : 6,285,446 B1
DATED        : September 4, 2001
INVENTOR(S)  : Farhadiroushan It is certified that error appears in the above-identified patent and that said Letters Patent is hereby corrected as shown below:

Column 1,
Line 14, "properites" should read -- properties --
Line 49, "¶interference" should read -- interference Column 2,
Line 18, "and" should be deleted
Line 40, "frequence" should read -- frequency --

Column 3,
Line 12, "interoferometer" should read -- interferometer --
Line 33, "tuneable" should read -- tunable --
Line 45, "of" should be deleted
Line 46, "senstivity" should read -- sensitivity --
Line 62, "strain;" should read -- strain; and --

Column 5,
Line 54, "temperature" should read -- with temperature --

Column 6,
Line 11, "anti-stokes and stokes" should read -- anti-Stokes and Stokes --
Line 15, "anti-stokes and stokes" should read -- anti-Stokes and Stokes --
Line 22, "stokes and anti-stokes" should read -- Stokes and anti-Stokes --
Line 49, "wherien" should read -- wherein --

Column 7,
Line 13, "Secp-" should read -- Spec- --

Signed and Sealed this

Fourteenth Day of May, 2002

*Attest:*

*Attesting Officer*

JAMES E. ROGAN
*Director of the United States Patent and Trademark Office*